(12) United States Patent
Li et al.

(10) Patent No.: US 10,324,292 B2
(45) Date of Patent: Jun. 18, 2019

(54) SHORT RANGE OPTICAL AMPLIFICATION MODULE, SPECTACLES, HELMET AND VR SYSTEM

(71) Applicant: Shenzhen Dlodlo New Technology Co., Ltd., Guangdong, Shenzhen (CN)

(72) Inventors: Gang Li, Shenzhen (CN); Weiping Tang, Shenzhen (CN)

(*) Notice: Subject to any disclaimer, the term of this patent is extended or adjusted under 35 U.S.C. 154(b) by 4 days.

(21) Appl. No.: 15/300,708

(22) PCT Filed: Mar. 21, 2016

(86) PCT No.: PCT/CN2016/076934
§ 371 (c)(1),
(2) Date: Sep. 29, 2016

(87) PCT Pub. No.: WO2017/161485
PCT Pub. Date: Sep. 28, 2017

(65) Prior Publication Data
US 2018/0120564 A1     May 3, 2018

(51) Int. Cl.
*G02B 5/30* (2006.01)
*G02F 1/01* (2006.01)
(Continued)

(52) U.S. Cl.
CPC .......... *G02B 27/0172* (2013.01); *G02B 5/30* (2013.01); *G02B 5/3083* (2013.01); *G02B 17/08* (2013.01);
(Continued)

(58) Field of Classification Search
CPC ... G02B 5/00; G02B 5/08; G02B 5/30; G02B 5/3025; G02B 5/3083; G02B 27/00;
(Continued)

(56) References Cited

U.S. PATENT DOCUMENTS 6,075,651 A    6/2000 Hoppe
6,094,242 A    7/2000 Yamanaka
(Continued)

FOREIGN PATENT DOCUMENTS

CN    1930511 A     3/2007
CN    104414747 A   3/2015
(Continued)

OTHER PUBLICATIONS

PCT International Search Report and Written Opinion dated Dec. 20, 2016 issued in PCT/CN2016/076934 (9 pages).
(Continued)

*Primary Examiner* — Loha Ben
(74) *Attorney, Agent, or Firm* — Caiderone Bullock LLC

(57) ABSTRACT

The present invention discloses a short-range optical amplification module, which includes a first phase delay plate, a transflective mirror, a second phase delay plate and a reflective polarizing plate that are arranged sequentially, wherein: the transflective mirror includes a first optical surface and a second optical surface; the first optical surface is adjacent to the second phase delay plate; the second optical surface is a transflective optical surface, and the second optical surface is adjacent to the first phase delay plate; the focal length fs2 of the reflection surface of the second optical surface meets the following condition: F≤fs2≤5F, wherein F is the system focal length of the short-range optical amplification module, and F meets the following condition: 10 mm≤F≤35 mm. By performing parameter refining on the fs2 that influences the optical amplification effect, the module can keep a small overall thickness while obtaining a large optical amplification effect, and it can be applied in a small-size virtual reality (VR) device, so that the VR device can realize a wide field angle, a large eyebox and a high-quality imaging effect, and hence a better user experience.

10 Claims, 10 Drawing Sheets

(51) Int. Cl.
  *G02B 17/08* (2006.01)
  *G02B 27/00* (2006.01)
  *G02B 27/01* (2006.01)
  *G02B 27/10* (2006.01)
  *G02B 27/14* (2006.01)
  *G02B 27/28* (2006.01)
  *G02B 27/40* (2006.01)
  *G02B 5/00* (2006.01)
  *G02B 27/09* (2006.01)

(52) U.S. Cl.
  CPC ......... *G02B 27/0081* (2013.01); *G02B 27/01* (2013.01); *G02B 27/10* (2013.01); *G02B 27/14* (2013.01); *G02B 27/28* (2013.01); *G02B 27/40* (2013.01); *G02F 1/01* (2013.01); *G02B 5/00* (2013.01); *G02B 27/017* (2013.01); *G02B 27/0983* (2013.01); *G02B 2027/0123* (2013.01); *G02B 2027/0178* (2013.01)

(58) Field of Classification Search
  CPC .. G02B 27/01; G02B 27/0101; G02B 27/017; G02B 27/0172; G02B 27/0977; G02B 27/0983; G02B 27/10; G02B 27/14; G02B 27/28; G02B 27/283; G02B 27/286; G02B 2027/011; G02B 2027/0116; G02B 2027/0118; G02B 2027/0123; G02B 27/0081; G02B 27/40; G02B 2027/0178; G02B 17/08; G03B 3/00; G03B 13/32; G03B 13/34; G03B 13/36; G03B 17/17; G02F 1/01; G02F 1/0136; G02F 1/13; G02F 1/1335; G01J 1/0266; G01J 3/0289; G01J 3/447; G01J 4/04
  USPC ............ 359/483.01, 484.01, 484.02, 485.01, 359/486.01, 487.01, 629–631, 633, 13, 359/279; 349/11, 15, 96, 194; 345/6–8; 353/7, 8; 348/345
  See application file for complete search history.

(56) References Cited

U.S. PATENT DOCUMENTS

| | | | |
|---|---|---|---|
| 6,853,491 | B1 | 2/2005 | Ruhle et al. |
| 7,411,637 | B2* | 8/2008 | Weiss ................. G02B 27/0101 349/11 |
| 8,009,349 | B2* | 8/2011 | McDowall ............ G02F 1/0136 359/318 |
| 8,767,284 | B2* | 7/2014 | McDowall ............ G02F 1/0136 359/320 |
| 9,223,155 | B2* | 12/2015 | McDowall ............ G02F 1/0136 |
| 9,594,263 | B2* | 3/2017 | McDowall ............ G02F 1/0136 |
| 9,690,097 | B2* | 6/2017 | Tang ................. G02B 27/0101 |
| 9,759,915 | B2* | 9/2017 | Tang ................. G02B 27/0101 |
| 10,185,148 | B2* | 1/2019 | Li ..................... G02B 27/0172 |
| 2007/0070508 | A1 | 3/2007 | Ruhle et al. |
| 2015/0070773 | A1 | 3/2015 | Wang et al. |
| 2016/0077351 | A1 | 3/2016 | Iwane |
| 2017/0017077 | A1 | 1/2017 | Tang et al. |

FOREIGN PATENT DOCUMENTS

| | | |
|---|---|---|
| CN | 105008986 A | 10/2015 |
| CN | 105093555 A | 11/2015 |
| CN | 105629494 A | 6/2016 |
| CN | 205562976 U | 9/2016 |
| EP | 0718645 A2 | 6/1996 |
| JP | H08-327940 A | 12/1996 |
| JP | 2000-275566 A | 10/2000 |
| JP | 2007-512581 A | 5/2007 |
| WO | WO 2014/129630 A1 | 8/2014 |

OTHER PUBLICATIONS

Japanese Office Action dated Apr. 24, 2018 in counterpart Japanese application No. 2016-560784 (2 pages) (Japanese only).
European Search Report dated May 15, 2018 in counterpart European Application No. 16777520.4 (7 pages).

* cited by examiner

SHORT RANGE OPTICAL AMPLIFICATION MODULE, SPECTACLES, HELMET AND VR SYSTEM

BACKGROUND OF THE INVENTION

Field of the Invention

The present invention relates to the technical field of optical apparatus, and in particular, to a short-range optical amplification module, spectacles, a helmet and a Virtual Reality (VR) system.

Description of Related Art

At present, intelligent Virtual Reality (VR) wearable devices mainly include VR spectacles and VR helmets. In order to provide a good user experience, an intelligent VR wearable device needs to realize a wide field angle, a large eyebox, high-quality imaging effect and a compact ultrathin structure, etc. An intelligent VR wearable device has an optical amplification module structure, which is the core component for realizing image conversion and determines the image quality and the structure of the intelligent VR wearable device.

In the structure of an existing optical amplification module, it includes, sequentially from the object side to the image side: a first phase delay plate, a lens unit (assembly), a second phase delay plate and a reflective polarizing plate; wherein, in the lens unit (assembly), the optical surface adjacent to the first phase delay plate is a transflective surface. In many researches, the lens unit (assembly) can transmissively amplify an optical image, and hence it is the core member of the optical amplification module structure. In order to realize a wide field angle, a large eyebox, high-quality imaging effect and a compact ultrathin structure, etc., of an intelligent VR wearable device, the design of the lens unit (assembly) needs to be optimized. The lens unit (assembly) is formed by arranging one or more lenses in a certain order; therefore, to optimize the lens unit (assembly) requires optimizing the lenses.

BRIEF SUMMARY OF THE INVENTION

The embodiments of the invention provide a short-range optical amplification module, a pair of spectacles, a helmet and a VR system, thereby solving the problem of the prior art.

On the first aspect, a short-range optical amplification module according to the invention includes a first phase delay plate, a transflective mirror, a second phase delay plate and a reflective polarizing plate that are arranged sequentially, wherein:

the transflective mirror includes a first optical surface and a second optical surface;

the first optical surface is adjacent to the second phase delay plate;

the second optical surface is a transflective optical surface, and the second optical surface is adjacent to the first phase delay plate; and the focal length $fs2$ of the reflection surface of the second optical surface meets the following condition: $F \leq fs2 \leq 5F$, wherein F is the system focal length of the short-range optical amplification module, and F meets the following condition: $10 \text{ mm} \leq F \leq 35 \text{ mm}$.

In conjunction with the first aspect, in a first possible implementation mode of the first aspect, the focal length $fs1$ of the first optical surface meets the following condition: $|fs1| > 2F$.

In conjunction with the first aspect, in a second possible implementation mode of the first aspect, the thickness H of the short-range optical amplification module meets the following condition: $8 \text{ mm} \leq H \leq 30 \text{ mm}$.

In conjunction with the first aspect or the first possible implementation mode or the second possible implementation mode of the first aspect, in a fourth possible implementation mode of the first aspect, the focal length $fs2$ of the reflection surface of the second optical surface meets the following condition: $1.5F \leq fs2 \leq 3F$.

In conjunction with the first aspect or the first possible implementation mode, the second possible implementation mode and the fourth possible implementation mode of the first aspect, in a fifth possible implementation mode of the first aspect, the eye relief of the short-range optical amplification module is 5-15 mm.

In the short-range optical amplification module according to the invention, parameter refining on the $fs2$ that influences the optical amplification effect enables the module to keep a small overall thickness while obtaining a large optical amplification effect and it can be applied in a small-size VR device, so that the VR device can realize a wide field angle, a large eyebox and a high-quality imaging effect, and hence a better user experience.

In the second aspect, the invention further provides a pair of spectacles, which includes the above short-range optical amplification module, wherein the spectacles further include a screen, which is set coaxially or noncoaxially with the short-range optical amplification module.

In the third aspect, the invention further provides a helmet which includes the above short-range optical amplification module, wherein the helmet further comprises a screen which is set coaxially or noncoaxially with the short-range optical amplification module.

In the fourth aspect, the invention further provides a VR system which includes the above spectacles or the above helmet. The above VR system employs the spectacles or helmet comprising the above short-range optical amplification module, so that it has a wide field angle, a large eyebox, high-quality imaging effect and a compact ultrathin structure, etc., and hence it can provide a good user experience. Specifically, reference may be made to the embodiments of the short-range optical amplification module.

BRIEF DESCRIPTION OF THE SEVERAL VIEWS OF THE DRAWINGS

These and other objects and features of this invention will become clear from the following description taken in conjunction with the preferred embodiments with reference to the accompanying drawings, in which.

Figure 1:
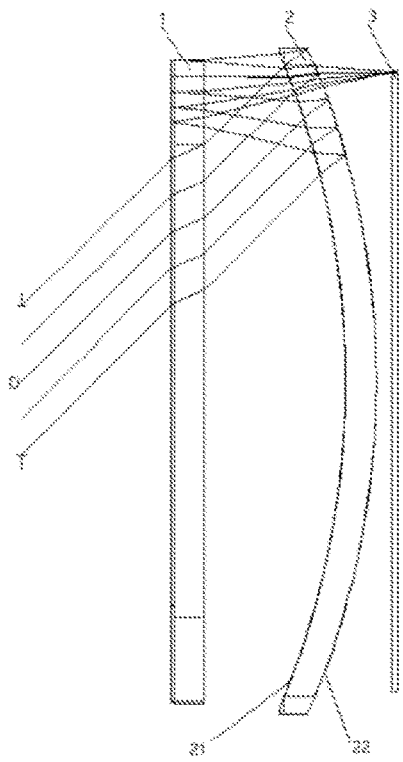
FIGS. 1 and 1A are diagrams schematically showing the overall construction of a short-range optical amplification module according to Embodiment 1 of the invention.

Wherein:

1: Reflective Polarizing Plate;
2: Transflective Mirror;
3: Screen.

DETAILED DESCRIPTION OF THE INVENTION

In order to make one skilled in the art better understand the solutions of the present invention, the embodiments of the invention will be described clearly and fully below with reference to the accompanying drawings. It is obvious that from the teaching of the present invention the skilled person may find other embodiments to realize the teaching of the present invention without applying additional inventive activity. These embodiments are still under the scope of the present invention.

One embodiment of the invention provides a short-range optical amplification module, which includes, (see FIG. 1A) sequentially from the object side to the image side, a screen 3, a first phase delay plate 4, a transflective mirror 2, a second phase delay plate 5 and a reflective polarizing plate 1; wherein: the transflective mirror includes a first optical surface 21 and a second optical surface 22; the first optical surface 21 is adjacent to the image side; the second optical surface 22 is a transflective optical surface, and it is adjacent to the object side; the focal length fs2 of the reflection surface of the second optical surface 22 meets the following condition: $F \leq fs2 \leq 5F$, wherein F is the system focal length of the short-range optical amplification module, 10 mm≤F≤35 mm. The object side is the screen side, and the image side is the imaging side of the short-range optical amplification module.

Referring to FIG. 1, FIG. 2, FIG. 3, FIG. 4 and FIG. 5, they show specific examples of short-range optical amplification modules according to the embodiments of the invention. The first phase delay plate is set adjacent to the light-emitting side of the screen 3, and the second phase delay plate is set on one side of the reflective polarizing plate 1 that is far from the image side. For easy explanation, in FIG. 1, FIG. 2, FIG. 3, FIG. 4 and FIG. 5, the first phase delay plate and the second phase delay plate are not shown. The first phase delay plate and the second phase delay plate are both 45-degree phase delay plates which perform 45-degree phase delay on light.

The reflective polarizing plate can realize a total reflection of orthogonal polarized light; however, when it is in the same direction as that of the polarized light, perspectivity may be realized. The first optical surface 21 of the transflective mirror 2 is a planar surface or a curved surface, and when it is a curved surface, it may be a spherical surface or an aspheric surface; the second optical surface 22 of transflective mirror 2 is a transflective optical surface. The transflective optical surface is the main source of the system optical power of the short-range optical amplification module. If its optical power is too high, for example, approaching the overall optical power of the system (fs2<F), it will be too difficult to correct the aberration; furthermore, the optical surface may appear too curved and the lens too thick, thereby causing the increase of the thickness of the system, which is adverse to the lightweight and thin design a VR wearable device requires. On the contrary, if its optical power is too low (fs2>5F), the optical power burdened on other lenses will be too high, and additional lenses need to be added to correct the aberration, which is adverse to the compact and lightweight design of the system.

In order to realize good user experience and portable structure of a VR wearable device, the system focal length F of the short-range optical amplification module is set as 10 mm≤F≤35 mm, wherein the system focal length F of the short-range optical amplification module is the effective focal length of the assembly of all lenses including the transflective mirror 2. When 10 mm≤F≤35 mm, the overall shape of the VR wearable device generally meet the requirements. The transflective mirror 2 is the core optical amplification component of the short-range optical amplification module, and its shape and parameters directly influence the shape and performance of the short-range optical amplification module. When the short-range optical amplification module is applied, the size of the screen 3 may be reduced to 0.9-2.5 inch, which contributes to the lightweight and ultrathin design of the VR wearable device.

The optical principle of the short-range optical amplification module is as follows: imaging light from the screen on the object side passes the first phase delay plate, penetrates the second optical surface 22 and then the first optical surface 21 of the transflective mirror 2, and then passes the second phase delay plate and reaches the reflective polarizing plate, whereby the light is reflected, and then the light again passes the second phase delay plate, and again penetrates the first optical surface 21 of the transflective mirror 2 and reaches the second optical surface 22 of the transflective mirror 2, whereby it is reflected, and again the light penetrates the first optical surface 21 of the transflective mirror 2, and then passes the second phase delay plate and the reflective polarizing plate and finally it reaches the image side where an image is to be formed, thereby the requirement of optical amplification may be fulfilled. Specifically, reference may be made to FIG. 1; and the optical principle in FIGS. 2-5 is the same as that in FIG. 1.

In the application of the short-range optical amplification module, in order to improve the imaging quality, other lenses are needed to contribute to system focal length and balance aberration, thus auxiliary lenses are provided as shown in FIG. 2, FIG. 3, FIG. 4 and FIG. 5 without limitation.

In order to realize a wide field angle, a large eyebox, high-quality imaging effect and a compact ultrathin structure when the short-range optical amplification module is applied to an intelligent VR wearable device, the reflection surface-containing focal length of the transflective mirror, i.e., the first focal length f of the transflective mirror, should meet the following condition:

$$F \leq f \leq 2F,\quad (1)$$

wherein the focal length, measured after incident light penetrates the first optical surface and is reflected by the second optical surface, is defined as the reflection surface-containing focal length f of the transflective mirror. The reflection surface-containing focal length f of the transflective mirror 2 is the main source of the optical power of the short-range optical amplification module; if the reflection surface-containing optical power is too high, for example, approaching the overall optical power of the system (f<F), it will be too difficult to correct the aberration; if the reflection surface-containing optical power is too low (f>2F), the optical power burdened on other lenses will be too high, and additional lenses are needed to correct the aberration, which is adverse to the compact and lightweight design of the system. By configuring f within such a range, the short-range optical amplification module may achieve a wide field angle V of more than 80° and allow a high screen resolution of 800*800~4000*4000, which is more favorable for the application of the short-range optical amplification module.

The focal length fs1 of the first optical surface meets the following condition:

$$|fs1|>2F.\quad (2)$$

If fs1 is too short, it means that the transflective mirror 2 may be too curved, which is adverse to the aberration correction; moreover, if the transflective mirror is too curved, it will cause the increase of the thickness of the optical system, which is adverse to the lightweight and thin design of a VR wearable device.

The thickness H of the short-range optical amplification module meets the following condition: 8 mm≤H≤30 mm. That is, in order to meet the requirement of a compact ultrathin structure on the VR wearable device, the thickness of the short-range optical amplification module, which is the maximum distance between the two sides of the short-range optical amplification module along the optical axis direction, should be 8-30 mm (in this embodiment). As a result, an eye relief of 5-15 mm may be realized, which is more favorable for meeting the requirement of a compact ultrathin structure on the VR wearable device while being convenient for use. The eye relief is the distance between the eyeball and the eyepiece (in the invention, it is the optical surface nearest to human eye) at which an observer can see clearly the image within the field of view.

In a further optimized technical solution, the focal length fs2 of the reflection surface of the second optical surface meets the following condition: 1.5 F≤fs2≤3F.

In order to obtain a large eyebox and a good imaging quality at the same time, the adjustable range of the aperture on the object side is designed as 1.7F-4F. That is, the aperture D, through which the light that takes part in imaging via the short-range optical amplification module passes, meets the following condition: 0.3F<D<0.6F, the corresponding eyebox is 5-10 mm. For the position of the aperture D, reference may be made to FIG. 1, and the aperture positions in FIG. 2, FIG. 3, FIG. 4 and FIG. 5 are the same as that of FIG. 1, which will not be described again here.

The short-range optical amplification module according to the embodiments of the invention will be further illustrated below in conjunction with the tables attached.

In the specific design parameter table of the short-range optical amplification module of each embodiment, OBJ represents an object in the optical system, IMA represents an image in the optical system, STO represents a diaphragm in the optical system, i represents the sequence $(i_0)+1$ of optical surfaces starting from the object side; the lenses are arranged in this table according to the actual optical path of incident light. In this system, light starts from the left to the right, and when it meets a material (Glass) listed as MIRROR, it will be reflected to the reverse direction, and when it is reflected to a second MIRROR, it will be reversed again from left to right, and finally it will reach the image surface.

Embodiment 1

Figure 1A:
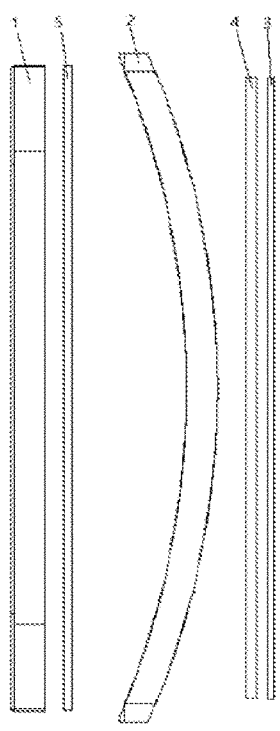

As shown in FIG. 1, in the short-range optical amplification module, the focal length of the second optical surface of the transflective mirror 2 is 1F, and the design parameters of the transflective mirror 2 are as shown in Table 1:

TABLE 1

| Surf | Type | Comment | Radius | Thickness | Glass | Diameter | Conic |
|---|---|---|---|---|---|---|---|
| OBJ | STANDARD | | Infinity | −200 | | 400 | 0 |
| STO | STANDARD | | Infinity | 9 | | 7 | 0 |
| 2 | STANDARD | | Infinity | 0.2 | PMMA | 24.685 | 0 |
| 3 | STANDARD | | Infinity | 2 | H-ZF52A | 24.8981 | 0 |
| 4 | STANDARD | | 888 | 9.210156 | | 26.6281 | −33 |
| 5 | STANDARD | | −55 | 2 | H-QK1 | 38.26443 | 0 |
| 6 | STANDARD | | −56 | −2 | MIRROR | 40.54977 | 0.915605 |
| 7 | STANDARD | | −55 | −9.21016 | | 40.02718 | 0 |
| 8 | STANDARD | | 888 | −2 | H-ZF53A | 39.72057 | −33 |

TABLE 1-continued

| Surf | Type | Comment | Radius | Thickness | Glass | Diameter | Conic |
|---|---|---|---|---|---|---|---|
| 9 | STANDARD | | Infinity | −0.2 | PMMA | 39.69469 | 0 |
| 10 | STANDARD | | Infinity | 0 | MIRROR | 39.69181 | 0 |
| 11 | STANDARD | | Infinity | 0.2 | PMMA | 39.69181 | 0 |
| 12 | STANDARD | | Infinity | 2 | H-ZF52A | 39.68893 | 0 |
| 13 | STANDARD | | 888 | 9.210156 | | 39.66306 | −33 |
| 14 | STANDARD | | −55 | 2 | H-QK1 | 39.77483 | 0 |
| 15 | STANDARD | | −56 | 1 | | 40.25757 | 0.915605 |
| 16 | STANDARD | | Infinity | 0.4 | BK7 | 41.00791 | 0 |
| IMA | STANDARD | | Infinity | | | 41.12973 | 0 |

In the above table, the first row OBJ represents the relevant design parameters of the object plane; the second row represents a diaphragm in the optical system, the aperture of which is 7 mm; the third row represents a membrane consisting of a reflective polarizing plate and a second phase delay plate in the optical module, of which the type is STANDARD (standard plane), the material is PMMA, the diameter is 24.685 mm, and the aspheric coefficient is 0; the fourth row and the fifth row respectively represent the data corresponding to the first optical surface and the second optical surface of the auxiliary lens, the material of the auxiliary lens is H-ZF52A, and in this embodiment, the first optical surface is an Infinity plane, and the curvature radius of the second optical surface is 888 mm; the sixth row and the seventh row respectively represent the data corresponding to first optical surface and second optical surface of the transflective mirror 2, the material of the transflective mirror 2 is H-QK1, the curvature radius of the first optical surface is −55 mm, and the curvature radius of the second optical surface is −56 mm; the eighth row to the sixteenth row represent the relevant parameters in the reflection and transmission of light among the membrane, the first lens 10 and the second lens 20. The seventeenth row represents the glass membrane in the liquid crystal layer of the screen 3, of which the thickness is 0.2057766 mm, and the material is BK7. The eighteenth row IMA represents an image in the optical system.

Other corresponding parameters of the short-range optical amplification module are as shown in Table 2:

TABLE 2

| | |
|---|---|
| Screen size C (inch) | 2.22 |
| Field angle V (°) | 90 |
| System focal length f (mm) | 29.16 |
| Effective focal length (fs2) of reflection surface of the transflective surface | 1F |

TABLE 2-continued

| | |
|---|---|
| Eyebox (mm) | 7 |
| Screen resolution | 800 * 800 |
| Thickness of optical system (mm) | 23.8 |
| Eye relief (mm) | 9 |
| F# aperture | 4 |
| Optical outer diameter (mm) | 40 |
| System distortion | 29.2 |

By setting the relevant parameters as shown in Table 1, it is clear from Table 2 that the effective focal length of the reflection surface of the transflective surface is 1F, the system focal length F is 29.16, the thickness of the optical system is 23.8, thus a field angle of 90° may be obtained; by designing the aperture set in front of the optical amplification module as 4, that is, designing the diameter D of the corresponding diaphragm as 7 mm, a large eyebox of 7 mm may be obtained correspondingly.

Figure 6:
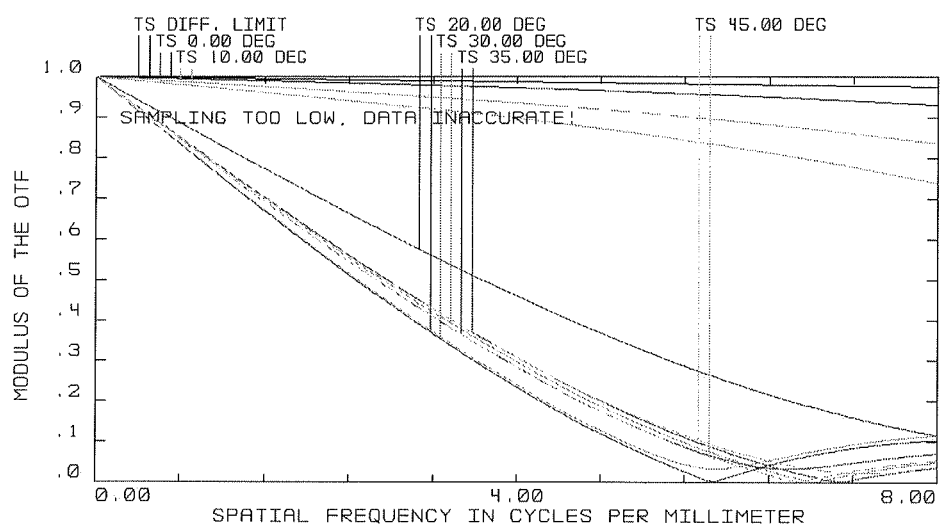
FIG. 6 is an MTF diagram of a short-range optical amplification module according to Embodiment 1 of the invention.
Figure 7:
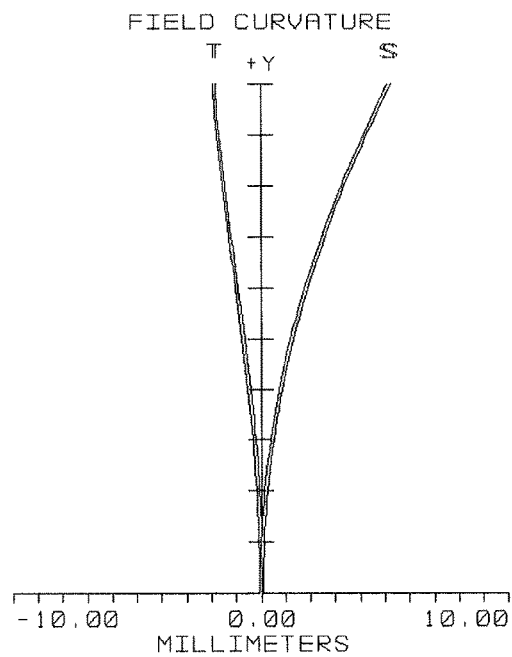
FIG. 7 is a field curvature diagram of a short-range optical amplification module according to Embodiment 1 of the invention.
Figure 8:
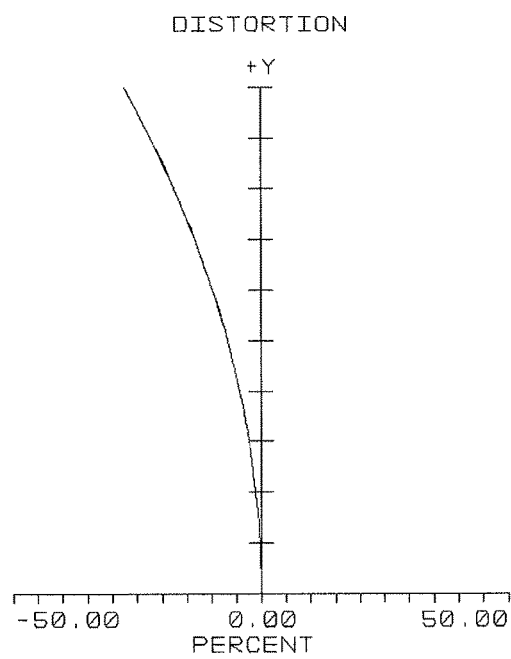
FIG. 8 is a distortion diagram of a short-range optical amplification module according to Embodiment 1 of the invention.

Furthermore, the screen size is designed as 2.22 inch, and the eye relief is designed as 5 mm; in conjunction with the MTF diagram of FIG. 6, it may obtain the abscissa (spatial frequency per millimeter) value with an average ordinate (modulation transfer function) higher than 0.18 in each visual field, thereby it may be obtained that the resolving power of the short-range optical amplification module may support a resolution of 800*800. The field curvature in FIG. 7 is controlled in a range of (−10 mm, 10 mm), and the distortion factor in FIG. 8 is controlled in a range of (−29.2%, 0).

Embodiment 2

Figure 2:
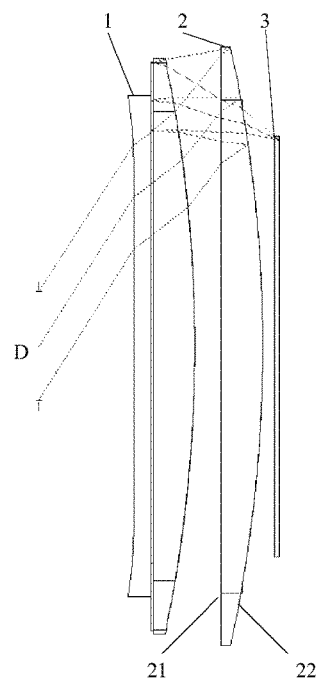
FIG. 2 is a diagram schematically showing the overall construction of a short-range optical amplification module according to Embodiment 2 of the invention.

As shown in FIG. 2, in the short-range optical amplification module, other lenses are further included besides the transflective mirror 2. The parameters of the lenses are adaptively adjusted according to the parameter requirements on the transflective mirror 2. The focal length of the second optical surface of the transflective mirror 2 is 2F, and the design parameters of the transflective mirror 2 are as shown in Table 3:

TABLE 3

| Surf | Type | Comment | Radius | Thickness | Glass | Diameter | Conic |
|---|---|---|---|---|---|---|---|
| OBJ | STANDARD | | Infinity | −166 | | 395.6622 | 0 |
| STO | STANDARD | | Infinity | 8 | | 7 | 0 |
| 2 | STANDARD | | 513.1123 | 1.5 | POLYCARB | 32 | −31.7813 |
| 3 | STANDARD | | Infinity | 0.2 | PMMA | 27.44791 | 0 |
| 4 | STANDARD | | Infinity | 3.5 | H-QK3L | 27.70273 | 0 |
| 5 | STANDARD | | −68.27 | 2.306556 | | 30.03965 | 0 |
| 6 | STANDARD | | Infinity | 3.5 | H-QK3L | 37.48099 | 0 |
| 7 | STANDARD | | −68.27 | 3.5 | MIRROR | 38.27103 | 0 |
| 8 | STANDARD | | Infinity | −2.30656 | | 38.1322 | 0 |
| 9 | STANDARD | | −68.27 | −3.5 | H-QK3L | 36.81879 | 0 |
| 10 | STANDARD | | Infinity | −0.2 | PMMA | 36.46478 | 0 |
| 11 | STANDARD | | Infinity | 0 | MIRROR | 36.39207 | 0 |
| 12 | STANDARD | | Infinity | 0.2 | PMMA | 36.39207 | 0 |

TABLE 3-continued

| Surf | Type | Comment | Radius | Thickness | Glass | Diameter | Conic |
|---|---|---|---|---|---|---|---|
| 13 | STANDARD | | Infinity | 3.5 | H-QK3L | 36.31936 | 0 |
| 14 | STANDARD | | −68.27 | 2.306556 | | 35.92007 | 0 |
| 15 | STANDARD | | Infinity | 3.5 | H-QK3L | 31.59251 | 0 |
| 16 | STANDARD | | −68.27 | 1 | | 30.55761 | 0 |
| 17 | STANDARD | | Infinity | 0.4 | BK7 | 26.92534 | 0 |

For the specific description of this table, reference may be made to Table 1, which will not be described again here.

The refined design parameters of the optical surfaces in the short-range optical amplification module are as shown in Table 4:

TABLE 4

| Surface OBJ | STANDARD |
|---|---|
| Surface STO | STANDARD |
| Surface 2 | EVENASPH |
| Coeff on r 2 | 0 |
| Coeff on r 4 | −4.69E−06 |
| Coeff on r 6 | −3.03E−09 |
| Coeff on r 8 | −7.70E−11 |
| Coeff on r 10 | −1.35E−15 |
| Coeff on r 12 | 0 |
| Coeff on r 14 | 0 |
| Coeff on r 16 | 0 |
| Aperture | Floating Aperture |
| Maximum Radius | 16 |

The aspheric surface formula is generally expressed as follows:

$$x = \frac{cr^2}{1+\sqrt{1-Kc^2r^2}} + dr^4 + er^6 + fr^8 + gr^{10} + hr^{12} + ir^{14} + jr^{16}$$

wherein: r is the distance from a point on the lens to the optical axis, c is curvature at the vertex of a curved surface, K is the conic constant, and d, e, f, g, h, I, i, j are polynomial coefficients. $c=-1/55.02969$, $K=-28.93212$, $d=5.4015026*10-5$, $e=-1.6567046*10-7$, $f=2.4870791*10-10$, $g=-4.6902803*10-13$, $h=i=j=0$ By substituting the above coefficients into x formula respectively, the aspheric surface equation of surface 6 will be obtained, and the rest may be deduced by analogy.

Other corresponding parameters of the short-range optical amplification module are as shown in Table 5:

TABLE 5

| | |
|---|---|
| Screen size C (inch) | 1.5 |
| Field angle V (°) | 100 |
| System focal length F (mm) | 16.7 |
| Effective focal length (fs2) of the reflection surface of the transflective surface | 2F |
| Eyebox (mm) | 7 |
| Screen resolution | 2000 * 2000 |
| Thickness of optical system (mm) | 12.3 |
| Eye relief (mm) | 8 |
| F# aperture | 2.4 |
| Optical outer diameter (mm) | 38 |
| System distortion | 34.6 |

Referring to Table 5, the effective focal length of the transflective surface will be 2F, and the thickness of the optical system will be 12.3 mm, thus a wide field angle of 100° may be obtained; by designing the aperture set in front of the optical amplification module as 2.4, that is, designing the diameter D of the corresponding diaphragm as 7 mm, a large eyebox of 7 mm may be obtained correspondingly.

Figure 9:
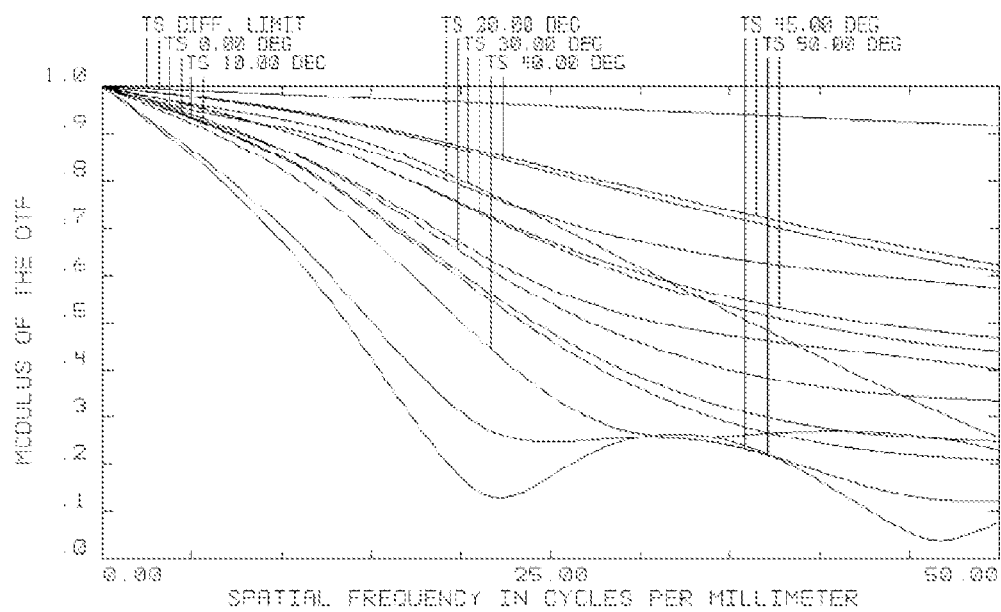
FIG. 9 is an MTF diagram of a short-range optical amplification module according to Embodiment 2 of the invention.
Figure 10:
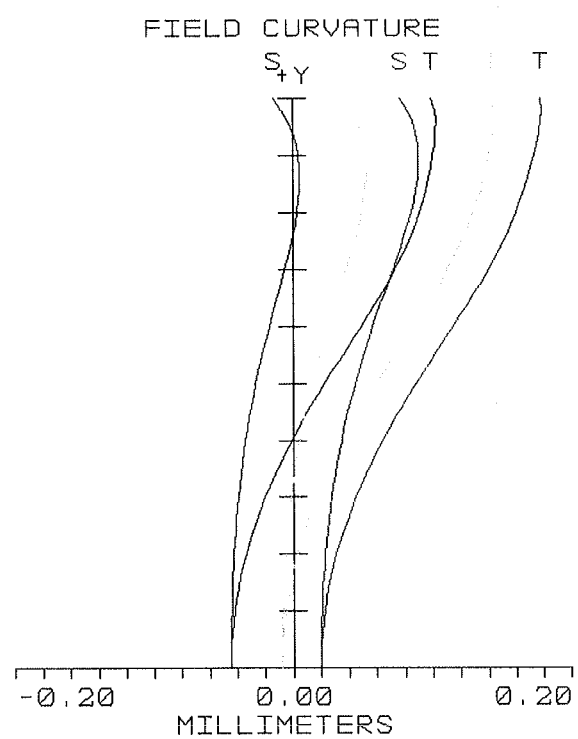
FIG. 10 is a field curvature diagram of a short-range optical amplification module according to Embodiment 2 of the invention.
Figure 11:
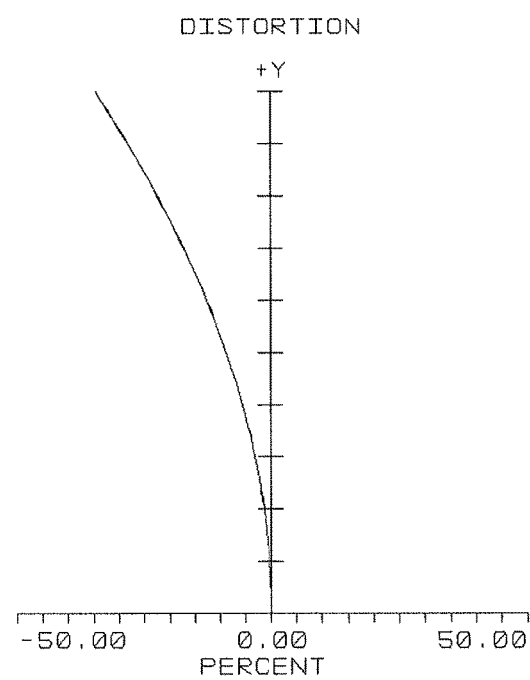
FIG. 11 is a distortion diagram of a short-range optical amplification module according to Embodiment 2 of the invention.

Furthermore, the screen size is designed as 1.5 inch, and the eye relief is designed as 8 mm; in conjunction with the MTF diagram of FIG. 9, it may obtain the abscissa (spatial frequency per millimeter) value with an average ordinate (modulation transfer function) higher than 0.18 in each visual field, thereby it may be obtained that the resolving power of the short-range optical amplification module may support a resolution of 2000*2000. The field curvature in FIG. 10 is controlled in a range of (−0.2 mm, 0.2 mm), and the distortion factor in FIG. 11 is controlled in a range of (−34.6%, 0).

Embodiment 3

Figure 3:
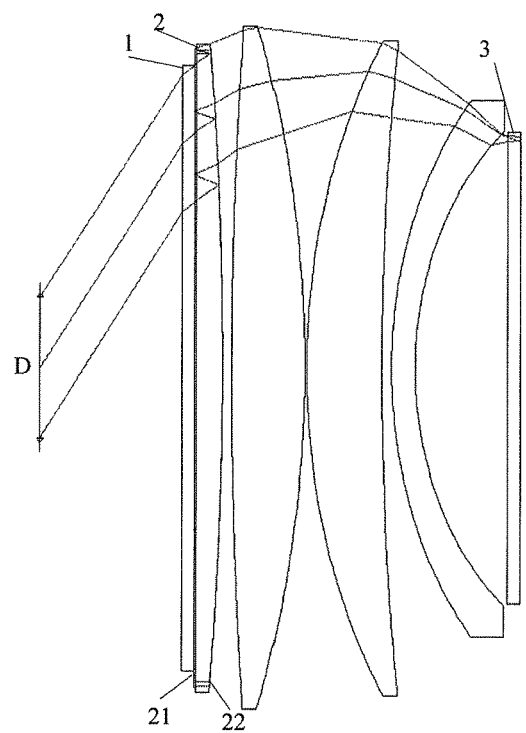
FIG. 3 is a diagram schematically showing the overall construction of a short-range optical amplification module according to Embodiment 3 of the invention.

As shown in FIG. 3, in the short-range optical amplification module, other lenses are further included besides the transflective mirror 2. The parameters of other lenses are adaptively adjusted according to the parameter requirements on the transflective mirror 2. Other lenses and the transflective mirror 2 complement each other, and the focal length of the second optical surface of the transflective mirror 2 is 5F. The design parameters of the transflective mirror 2 are as shown in Table 6:

TABLE 6

| Surf | Type | Comment | Radius | Thickness | Glass | Diameter | Conic |
|---|---|---|---|---|---|---|---|
| OBJ | STANDARD | | Infinity | Infinity | | 0 | 0 |
| 1 | PARAXIAL | | — | 0 | | 6 | — |
| STO | STANDARD | | Infinity | 8 | | 6 | 0 |
| 3 | STANDARD | | Infinity | 0.7 | BK7 | 24.87606 | 0 |
| 4 | STANDARD | | Infinity | 0.1 | | 25.69182 | 0 |
| 5 | STANDARD | | Infinity | 1.5 | H-ZF52A | 25.92777 | 0 |
| 6 | STANDARD | | −128 | 0 | | 26.66036 | 0 |
| 7 | STANDARD | | −128 | 0 | MIRROR | 26.66036 | 0 |
| 8 | STANDARD | | −128 | −1.5 | H-ZF52A | 26.66036 | 0 |
| 9 | STANDARD | | Infinity | −0.1 | | 27.01796 | 0 |
| 10 | STANDARD | | Infinity | 0 | MIRROR | 27.10511 | 0 |
| 11 | STANDARD | | Infinity | 0.1 | | 27.10511 | 0 |
| 12 | STANDARD | | Infinity | 1.5 | H-ZF52A | 27.19225 | 0 |

TABLE 6-continued

| Surf | Type | Comment | Radius | Thickness | Glass | Diameter | Conic |
|---|---|---|---|---|---|---|---|
| 13 | STANDARD | | −128 | 0.5 | | 27.52928 | 0 |
| 14 | STANDARD | | 159.8429 | 4.092556 | H-ZLAF53A | 28.75338 | 0 |
| 15 | STANDARD | | −40.9909 | 0.1 | | 28.95683 | 0 |
| 16 | STANDARD | | 24.54956 | 4.248117 | H-ZF52A | 27.83833 | 0 |
| 17 | STANDARD | | 105.5351 | 0.556736 | | 27.29029 | 0 |
| 18 | STANDARD | | 16.75357 | 1.336224 | H-ZF7LA | 22.77492 | 0 |
| 19 | STANDARD | | 12.62717 | 5.216597 | | 20.14174 | 0 |
| 20 | STANDARD | | Infinity | 0.7 | BK7 | 19.99691 | 0 |
| 21 | STANDARD | | Infinity | 0 | | 19.68388 | 0 |
| 22 | STANDARD | | Infinity | 0 | | 19.68388 | 0 |
| IMA | STANDARD | | Infinity | | | 19.68388 | 0 |

For the specific description of this table, reference may be made to Table 1, which will not be described again here.

Other corresponding parameters of the short-range optical amplification module are as shown in Table 7:

TABLE 7

| | |
|---|---|
| Screen size C (inch) | 1.11 |
| Field angle V (°) | 100 |
| System focal length F (mm) | 12.8 |
| Effective focal length (fs2) of the reflection surface of the transflective surface | 5F |
| Eyebox (mm) | 6 |
| Screen resolution | 800 * 800 |
| Thickness of optical system (mm) | 27 |
| Eye relief (mm) | 8 |
| F# aperture | 2.1 |
| Optical outer diameter (mm) | 29 |
| System distortion | 35.6 |

By setting the relevant parameters as shown in Table 6, it is clear from Table 7 that the effective focal length of the transflective surface is 5F, and the thickness of the optical system is 27 mm, thus a wide field angle of 100° may be obtained; by designing the aperture set in front of the optical amplification module as 2.1, that is, designing the diameter D of the corresponding diaphragm as 6 mm, a large eyebox of 6 mm may be obtained correspondingly.

Figure 12:
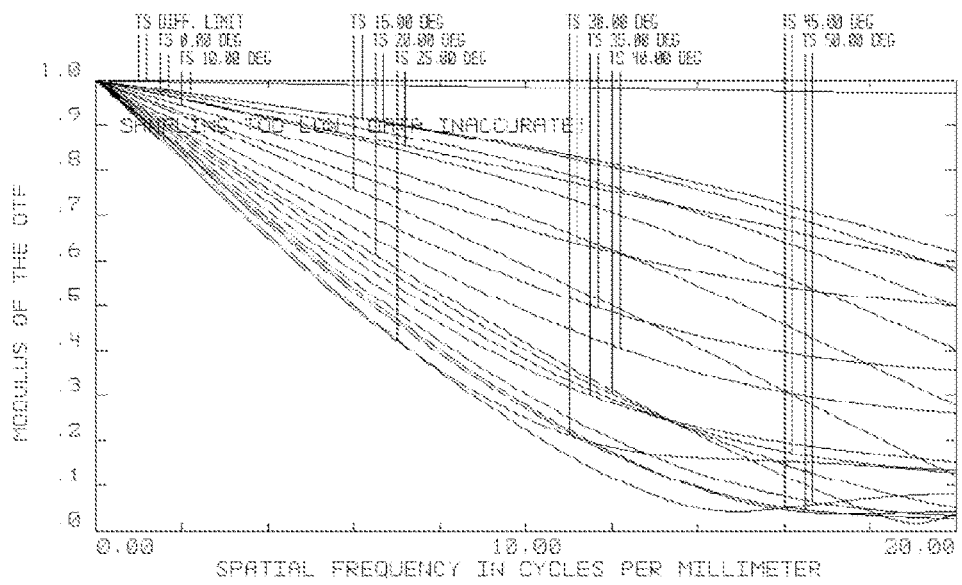
FIG. 12 is an MTF diagram of a short-range optical amplification module according to Embodiment 3 of the invention.
Figure 13:
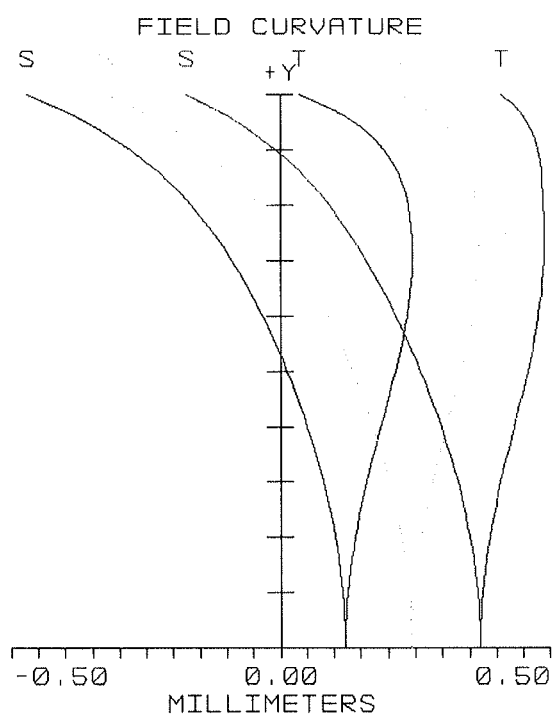
FIG. 13 is a field curvature diagram of a short-range optical amplification module according to Embodiment 3 of the invention.
Figure 14:
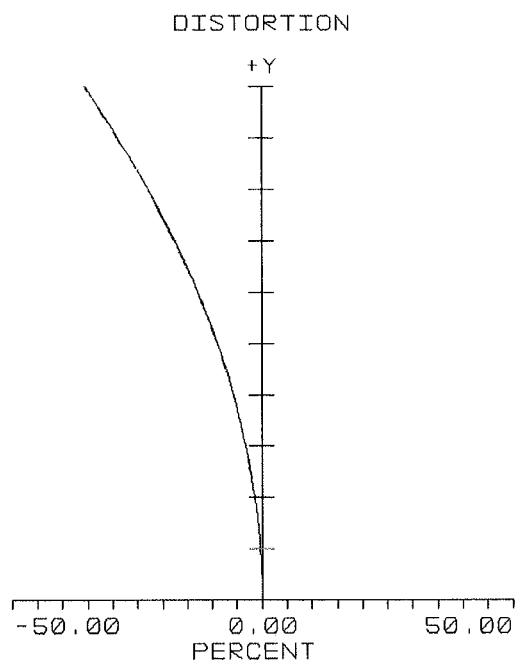
FIG. 14 is a distortion diagram of a short-range optical amplification module according to Embodiment 3 of the invention.

Furthermore, the screen size is designed as 1.11 inch, and the eye relief is designed as 8 mm; in conjunction with the MTF diagram of FIG. 12, it may obtain the abscissa (spatial frequency per millimeter) value with an average ordinate (modulation transfer function) higher than 0.18 in each visual field, thereby it may be obtained that the resolving power of the short-range optical amplification module may support a resolution of 800*800. The field curvature in FIG. 13 is controlled in a range of (−0.5 mm, 0.5 mm), and the distortion factor in FIG. 14 is controlled in a range of (−35.6%, 0).

Embodiment 4

Figure 4:
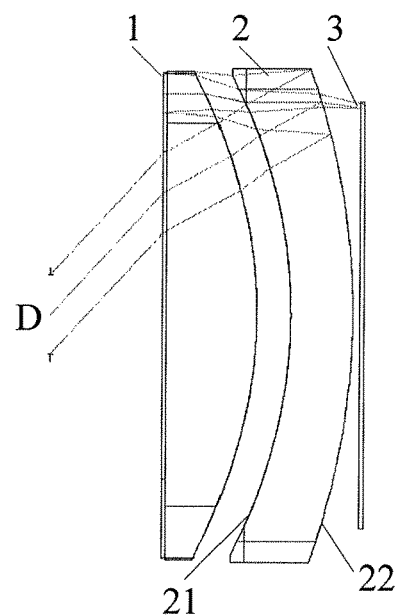
FIG. 4 is a diagram schematically showing the overall construction of a short-range optical amplification module according to Embodiment 4 of the invention.

As shown in FIG. 4, in the short-range optical amplification module, other lenses are further included besides the transflective mirror 2. The parameters of other lenses are adaptively adjusted according to the parameter requirements on the transflective mirror 2. Other lenses and the transflective mirror 2 complement each other, and the focal length of the second optical surface of the transflective mirror 2 is 1.5F. The design parameters of the transflective mirror 2 are as shown in Table 8:

TABLE 8

| Surf | Type | Comment | Radius | Thickness | Glass | Diameter | Conic |
|---|---|---|---|---|---|---|---|
| OBJ | STANDARD | | Infinity | Infinity | | 0 | 0 |
| 1 | PARAXIAL | | — | 0 | | 7 | — |
| STO | STANDARD | | Infinity | 9 | | 7 | 0 |
| 3 | STANDARD | | Infinity | 0.3 | BK7 | 28.42006 | 0 |
| 4 | STANDARD | | Infinity | 0 | | 28.77137 | 0 |
| 5 | STANDARD | | Infinity | 7.248401 | PMMA | 28.77137 | 0 |
| 6 | EVENASPH | | −47.0861 | 2.733572 | | 33.68449 | −2.16477 |
| 7 | STANDARD | | −48.73 | 5 | BK7 | 36.96593 | 0 |
| 8 | STANDARD | | −69 | −5 | MIRROR | 43.27666 | 0 |
| 9 | EVENASPH | | −48.73 | −2.73357 | | 42.14792 | 0 |
| 10 | EVENASPH | | −47.0861 | −7.2484 | PMMA | 42.82452 | −2.16477 |
| 11 | STANDARD | | Infinity | 0 | | 42.53514 | 0 |
| 12 | STANDARD | | Infinity | −0.3 | BK7 | 42.53514 | 0 |
| 13 | STANDARD | | Infinity | 0.3 | MIRROR | 42.49627 | 0 |
| 14 | STANDARD | | Infinity | 0 | | 42.4574 | 0 |
| 15 | STANDARD | | Infinity | 7.248401 | PMMA | 42.4574 | 0 |
| 16 | EVENASPH | | −47.0861 | 2.733572 | | 42.14882 | −2.16477 |
| 17 | EVENASPH | | −48.73 | 5 | BK7 | 39.72479 | 0 |
| 18 | STANDARD | | −69 | 0.5 | | 39.04473 | 0 |
| 19 | STANDARD | | Infinity | 0.4 | BK7 | 37.40189 | 0 |
| IMA | STANDARD | | Infinity | | | 37.27344 | 0 |

For the specific description of this table, reference may be made to Table 1, and it will not be described again here.

The refined design parameters of the optical surfaces in the short-range optical amplification module are as shown in Table 9:

TABLE 9

| | |
|---|---|
| Surface OBJ | STANDARD |
| Surface 1 | PARAXIAL |
| Focal length | 2000 |
| OPD Mode | 1 |
| Surface STO | STANDARD |
| Surface 3 | STANDARD |
| Surface 4 | STANDARD |
| Surface 5 | STANDARD |
| Surface 6 | EVENASPH |
| Coeff on r 2 | 0 |
| Coeff on r 4 | −1.27E−05 |
| Coeff on r 6 | 7.44E−08 |
| Coeff on r 8 | −1.90E−10 |
| Coeff on r 10 | 1.70E−13 |
| Coeff on r 12 | 0 |
| Coeff on r 14 | 0 |
| Coeff on r 16 | 0 |
| Surface 7 | STANDARD |
| Surface 8 | STANDARD |
| Surface 9 | EVENASPH |
| Coeff on r 2 | 0 |
| Coeff on r 4 | 0 |
| Coeff on r 6 | 0 |
| Coeff on r 8 | 0 |
| Coeff on r 10 | 0 |
| Coeff on r 12 | 0 |
| Coeff on r 14 | 0 |
| Coeff on r 16 | 0 |
| Surface 10 | EVENASPH |
| Coeff on r 2 | 0 |
| Coeff on r 4 | −1.27E−05 |
| Coeff on r 6 | 7.44E−08 |
| Coeff on r 8 | −1.90E−10 |
| Coeff on r 10 | 1.70E−13 |
| Coeff on r 12 | 0 |
| Coeff on r 14 | 0 |
| Coeff on r 16 | 0 |
| Surface 11 | STANDARD |
| Surface 12 | STANDARD |
| Surface 13 | STANDARD |
| Surface 14 | STANDARD |
| Surface 15 | STANDARD |
| Surface 16 | EVENASPH |
| Coeff on r 2 | 0 |
| Coeff on r 4 | −1.27E−05 |
| Coeff on r 6 | 7.44E−08 |
| Coeff on r 8 | −1.90E−10 |
| Coeff on r 10 | 1.70E−13 |
| Coeff on r 12 | 0 |
| Coeff on r 14 | 0 |
| Coeff on r 16 | 0 |
| Surface 17 | EVENASPH |
| Coeff on r 2 | 0 |
| Coeff on r 4 | 0 |
| Coeff on r 6 | 0 |
| Coeff on r 8 | 0 |
| Coeff on r 10 | 0 |
| Coeff on r 12 | 0 |
| Coeff on r 14 | 0 |
| Coeff on r 16 | 0 |
| Surface 18 | STANDARD |
| Surface 19 | STANDARD |
| Surface IMA | STANDARD |

For the explanation of the specific parameters in the above table, reference may be made to Table 4.

Other corresponding parameters of the short-range optical amplification module are as shown in Table 10:

TABLE 10

| | |
|---|---|
| Screen size C (inch) | 2.1 |
| Field angle V (°) | 100 |
| System focal length F (mm) | 23 |
| Effective focal length (fs2) of the reflection surface of the transflective surface | 1.5F |
| Eyebox (mm) | 7 |
| Screen resolution | 1000 * 1000 |
| Thickness of optical system (mm) | 16.2 |
| Eye relief (mm) | 9 |
| F# aperture | 3.3 |
| Optical outer diameter (mm) | 44 |
| System distortion | 34 |

By setting the relevant parameters as shown in Tables 8 and 9, it is clear from Table 10 that the effective focal length of the reflection surface of the transflective surface will be 1.5F, and the thickness of the optical system will be 16.2 mm, thus a wide field angle of 100° may be obtained; by designing the aperture set in front of the optical amplification module as 3.3, that is, designing the diameter D of the corresponding diaphragm as 7 mm, a large eyebox of 7 mm may be obtained correspondingly.

Figure 15:
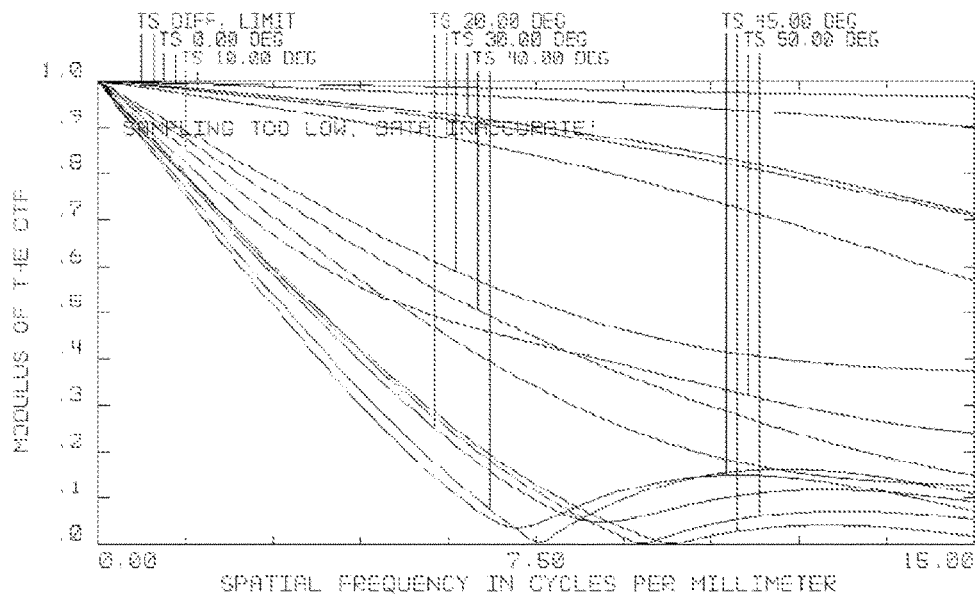
FIG. 15 is an MTF diagram of a short-range optical amplification module according to Embodiment 4 of the invention.
Figure 16:
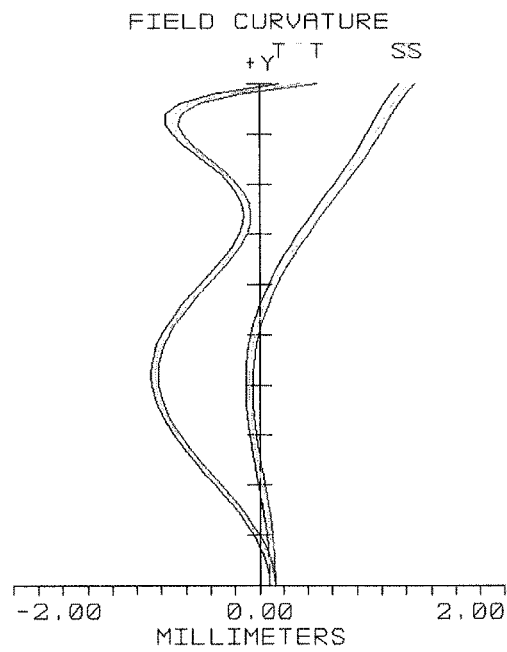
FIG. 16 is a field curvature diagram of a short-range optical amplification module according to Embodiment 4 of the invention.
Figure 17:
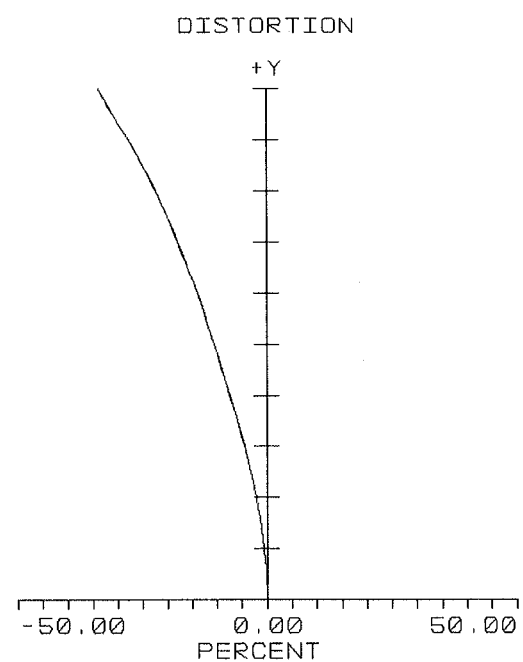
FIG. 17 is a distortion diagram of a short-range optical amplification module according to Embodiment 4 of the invention.

Furthermore, the screen size is designed as 2.1 inch, and the eye relief is designed as 9 mm. In conjunction with the MTF diagram of FIG. 15, it may obtain the abscissa (spatial frequency per millimeter) value with an average ordinate (modulation transfer function) higher than 0.18 in each visual field, thereby it may be obtained that the resolving power of the short-range optical amplification module may support a resolution of 1000*1000. The field curvature in FIG. 16 is controlled in a range of (−2 mm, 2 mm), and the distortion factor in FIG. 17 is controlled in a range of (−34%, 0).

Embodiment 5

Figure 5:
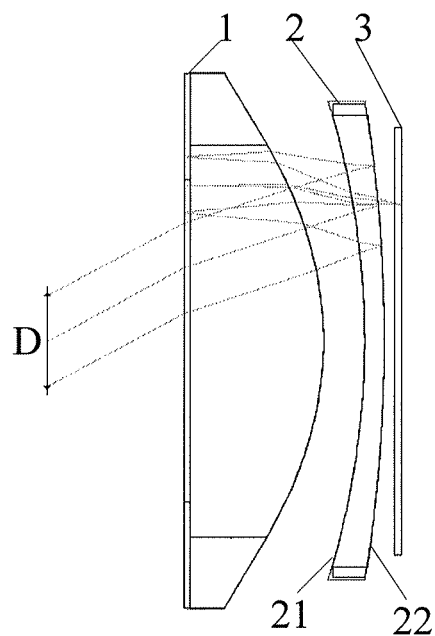
FIG. 5 is a diagram schematically showing the overall construction of a short-range optical amplification module according to Embodiment 5 of the invention.

As shown in FIG. 5, in the short-range optical amplification module, other lenses are further included besides the transflective mirror 2. The parameters of other lenses are adaptively adjusted according to the parameter requirements on the transflective mirror 2. Other lenses and the transflective mirror 2 complement each other, and the focal length of the second optical surface of the transflective mirror 2 is 3F. The design parameters of the transflective mirror 2 are as shown in Table 11:

TABLE 11

| Surf | Type | Comment | Radius | Thickness | Glass | Diameter | Conic |
|---|---|---|---|---|---|---|---|
| OBJ | STANDARD | | Infinity | Infinity | | 0 | 0 |
| 1 | PARAXIAL | | — | 0 | | 5 | — |
| STO | STANDARD | | Infinity | 7 | | 5 | 0 |
| 3 | STANDARD | | Infinity | 0.3 | BK7 | 17.49994 | 0 |
| 4 | STANDARD | | Infinity | 0 | | 17.79357 | 0 |
| 5 | STANDARD | | Infinity | 6.902743 | E48R | 17.79357 | 0 |
| 6 | EVENASPH | | −19.7284 | 2.100086 | | 21.64757 | −2.16622 |
| 7 | STANDARD | | −47.9121 | 1 | BK7 | 24.77249 | 0 |
| 8 | STANDARD | | −90 | −1 | MIRROR | 26.08831 | 0 |

TABLE 11-continued

| Surf | Type | Comment | Radius | Thickness | Glass | Diameter | Conic |
|---|---|---|---|---|---|---|---|
| 9 | EVENASPH | | −47.9121 | −2.10009 | | 26.40394 | 0 |
| 10 | EVENASPH | | −19.7284 | −6.90274 | E48R | 29.59359 | −2.16622 |
| 11 | STANDARD | | Infinity | 0 | | 29.51238 | 0 |
| 12 | STANDARD | | Infinity | −0.3 | BK7 | 29.51238 | 0 |
| 13 | STANDARD | | Infinity | 0.3 | MIRROR | 29.49827 | 0 |
| 14 | STANDARD | | Infinity | 0 | | 29.48417 | 0 |
| 15 | STANDARD | | Infinity | 6.902743 | E48R | 29.48417 | 0 |
| 16 | EVENASPH | | −19.7284 | 2.100086 | | 29.40044 | −2.16622 |
| 17 | EVENASPH | | −47.9121 | 1 | BK7 | 24.93982 | 0 |
| 18 | STANDARD | | −90 | 0.5 | | 24.40904 | 0 |
| 19 | STANDARD | | Infinity | 0.4 | BK7 | 23.59307 | 0 |
| IMA | STANDARD | | Infinity | | | 23.43539 | 0 |

For the specific description of this table, reference may be made to Table 1, which will not be described again here.

The refined design parameters of the optical surfaces in the short-range optical amplification module are as shown in Table 12:

TABLE 12

| Surface OBJ | STANDARD |
|---|---|
| Surface 1 | PARAXIAL |
| Focal length | 2000 |
| OPD Mode | 1 |
| Surface STO | STANDARD |
| Surface 3 | STANDARD |
| Surface 4 | STANDARD |
| Surface 5 | STANDARD |
| Surface 6 | EVENASPH |
| Coeff on r 2 | 0 |
| Coeff on r 4 | −4.51E−06 |
| Coeff on r 6 | −1.93E−07 |
| Coeff on r 8 | 1.31E−09 |
| Coeff on r 10 | −2.11E−12 |
| Coeff on r 12 | 0 |
| Coeff on r 14 | 0 |
| Coeff on r 16 | 0 |
| Surface 7 | STANDARD |
| Surface 8 | STANDARD |
| Surface 9 | EVENASPH |
| Coeff on r 2 | 0 |
| Coeff on r 4 | 0 |
| Coeff on r 6 | 0 |
| Coeff on r 8 | 0 |
| Coeff on r 10 | 0 |
| Coeff on r 12 | 0 |
| Coeff on r 14 | 0 |
| Coeff on r 16 | 0 |
| Surface 10 | EVENASPH |
| Coeff on r 2 | 0 |
| Coeff on r 4 | −4.51E−06 |
| Coeff on r 6 | −1.93E−07 |
| Coeff on r 8 | 1.31E−09 |
| Coeff on r 10 | −2.11E−12 |
| Coeff on r 12 | 0 |
| Coeff on r 14 | 0 |
| Coeff on r 16 | 0 |
| Surface 11 | STANDARD |
| Surface 12 | STANDARD |
| Surface 13 | STANDARD |
| Surface 14 | STANDARD |
| Surface 15 | STANDARD |
| Surface 16 | EVENASPH |
| Coeff on r 2 | 0 |
| Coeff on r 4 | −4.51E−06 |
| Coeff on r 6 | −1.93E−07 |
| Coeff on r 8 | 1.31E−09 |
| Coeff on r 10 | −2.11E−12 |
| Coeff on r 12 | 0 |
| Coeff on r 14 | 0 |
| Coeff on r 16 | 0 |
| Surface 17 | EVENASPH |
| Coeff on r 2 | 0 |
| Coeff on r 4 | 0 |
| Coeff on r 6 | 0 |
| Coeff on r 8 | 0 |
| Coeff on r 10 | 0 |
| Coeff on r 12 | 0 |
| Coeff on r 14 | 0 |
| Coeff on r 16 | 0 |
| Surface 18 | STANDARD |
| Surface 19 | STANDARD |
| Surface IMA | STANDARD |

For the explanation of the specific parameters in the above table, reference may be made to Table 4.

Other corresponding parameters of the short-range optical amplification module are as shown in Table 13:

TABLE 13

| Screen size C (inch) | 1.3 |
|---|---|
| Field angle V (°) | 82 |
| System focal length F (mm) | 15 |
| Effective focal length (fs2) of the reflection surface of the transflective surface | 3F |
| Eyebox (mm) | 5 |
| Screen resolution | 1000 * 1000 |
| Thickness of optical system (mm) | 11.2 |
| Eye relief (mm) | 7 |
| F# aperture | 3 |
| Optical outer diameter (mm) | 30 |
| System distortion | 21.80% |

By setting the relevant parameters as shown in Tables 11 and 12, it is clear from Table 13 that the effective focal length of the reflection surface of the transflective surface is 3F, and the thickness of the optical system is 11.2 mm, thus a wide field angle of 82° may be obtained; by designing the aperture set in front of the optical amplification module as 3, that is, designing the diameter D of the corresponding diaphragm as 5 mm, a large eyebox of 5 mm may be obtained correspondingly.

Figure 18:
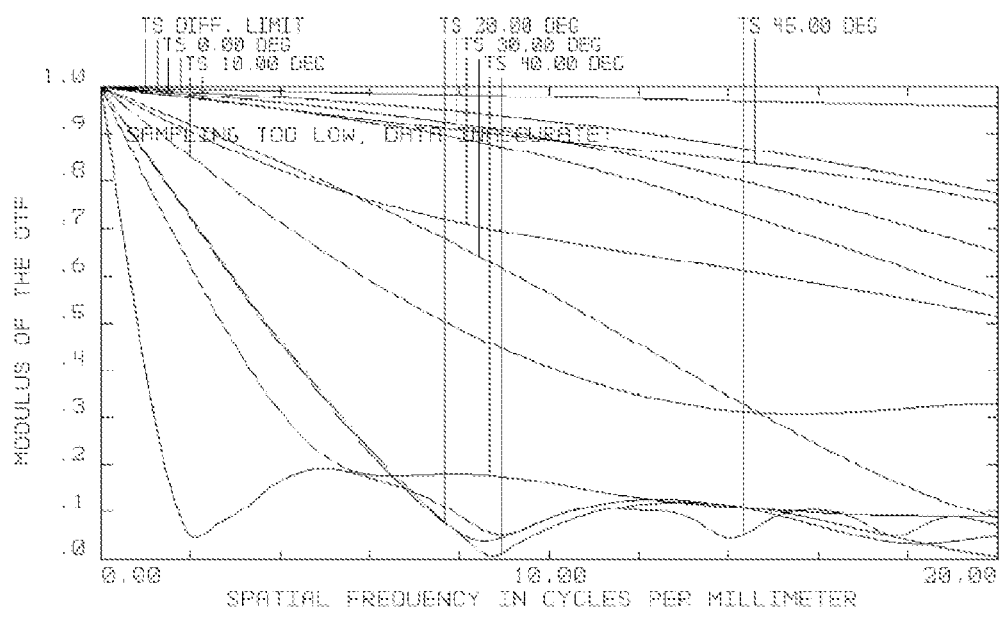
FIG. 18 is an MTF diagram of a short-range optical amplification module according to Embodiment 5 of the invention.
Figure 19:
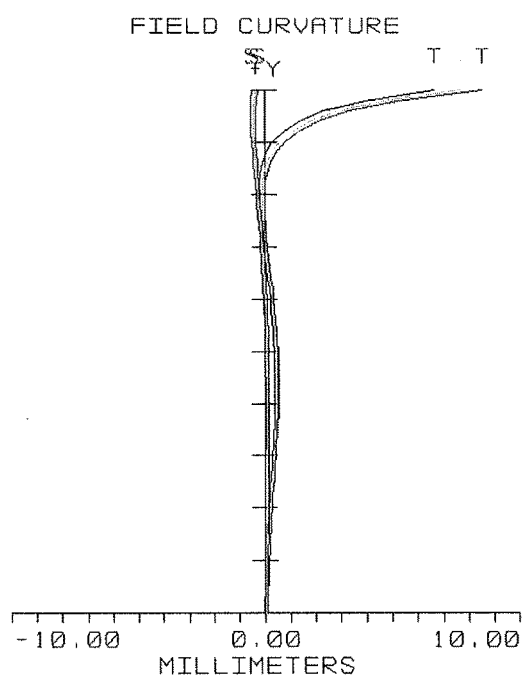
FIG. 19 is a field curvature diagram of a short-range optical amplification module according to Embodiment 5 of the invention.
Figure 20:
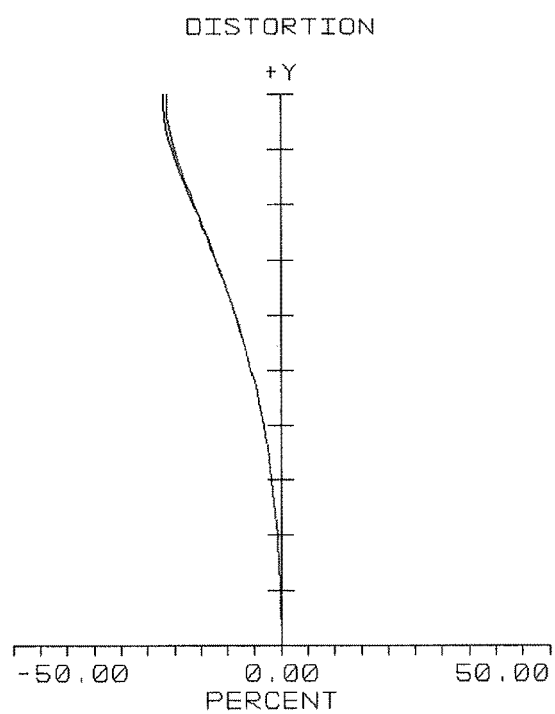
FIG. 20 is a distortion diagram of a short-range optical amplification module according to Embodiment 5 of the invention.

Furthermore, the screen size is designed as 2.1 inch, and the eye relief is designed as 9 mm. In conjunction with the MTF diagram of FIG. 18, it may obtain the abscissa (spatial frequency per millimeter) value with an average ordinate (modulation transfer function) higher than 0.18 in each visual field, thereby it may be obtained that the resolving power of the short-range optical amplification module may support a resolution of 1000*1000. The field curvature in FIG. 19 is controlled in a range of (−2 mm, 2 mm), and the distortion factor in FIG. 20 is controlled in a range of (−34%, 0).

Based on the short-range optical amplification module according to the invention, the present invention further provides a pair of spectacles which include the short-range optical amplification module in the above embodiments. The spectacles further include a screen 3 which is set coaxially or noncoaxially with the short-range optical amplification module. The screen 3 in FIGS. 1-5 is set coaxially with the short-range optical amplification module for convenient expression; however, in use, the screen 3 may be set coaxially or noncoaxially with the short-range optical amplification module according to specific application requirements.

Based on the short-range optical amplification module according to the invention, the present invention further provides a helmet which includes the short-range optical amplification module in the above embodiments. The helmet further includes a screen 3 which is set coaxially or noncoaxially with the short-range optical amplification module. The screen 3 in FIGS. 1-5 is set coaxially with the short-range optical amplification module here for convenient expression; however, in use, the screen 3 may be set coaxially or noncoaxially with the short-range optical amplification module according to specific application requirements.

Based on the spectacles and the helmet according to the invention, the present invention further provides a VR system which includes the spectacles or the helmet in the above embodiments and is used in an intelligent Virtual Reality (VR) wearable device. The said VR system includes a pair of spectacles or a helmet containing the short-range optical amplification module, so that the VR system will have a wide field angle, a large eyebox, high-quality imaging effect and a compact ultrathin structure, etc., and hence it can provide a good user experience. Specifically, reference may be made to the embodiments of the short-range optical amplification module.

Each embodiment in this specification is described in a progressive way. For the same or similar parts in different embodiments, reference may be made to each other. Each embodiment emphasizes its distinctions from other embodiments.

The above embodiments of the invention do not intend to limit the scope of the invention. Any modifications, equivalent substitutions or improvements within the spirit and principle of the invention will be construed as falling into the protection scope of the invention.

What is claimed is:

1. A short-range optical amplification module, comprising: a transflective mirror and a reflective polarizing plate that are arranged sequentially from an object side to an image side, wherein:
the transflective mirror includes a first optical surface and a second optical surface;
the second optical surface is a transflective optical surface, and the second optical surface is for arranging adjacent to a first phase delay plate;
the first optical surface is for arranging adjacent to a second phase delay plate; and
a focal length of a reflection surface of the second optical surface is greater than or equal to a system focal length of the short-range optical amplification module and is less than or equal to five times the system focal length of the short-range optical amplification module, and the system focal length of the short-range optical amplification module is greater than or equal to 10 mm and is less than or equal to 35 mm.

2. The short-range optical amplification module according to claim 1, wherein an absolute value of a focal length of the first optical surface is greater than two times the system focal length of the short-range optical amplification module.

3. The short-range optical amplification module according to claim 1, wherein a thickness of the short-range optical amplification module is greater than or equal to 8 mm and is less than or equal to 30 mm.

4. The short-range optical amplification module according to claim 1, wherein the focal length of the reflection surface of the second optical surface is greater than or equal to 1.5 times the system focal length of the short-range optical amplification module and is less than or equal to three times the system focal length of the short-range optical amplification module.

5. The short-range optical amplification module according to claim 4, wherein an aperture D, through which a light beam that takes part in imaging via the short-range optical amplification module passes, meets the following condition: $0.3F<D<0.6F$, wherein F is a system focal length of the short-range optical amplification module.

6. The short-range optical amplification module according to claim 5, wherein an eye relief of the short-range optical amplification module is 5-15 mm.

7. A pair of spectacles, comprising: the short-range optical amplification module according to claim 1, wherein the spectacles further comprise a screen, which is set coaxially or noncoaxially with the short-range optical amplification module.

8. A virtual reality (VR) system, comprising: the spectacles according to claim 7.

9. A helmet, comprising: the short-range optical amplification module according to claim 1, wherein the helmet further comprises a screen, which is set coaxially or noncoaxially with the short-range optical amplification module.

10. A virtual reality (VR) system, comprising: the helmet according to claim 9.

* * * * *